United States Patent Office 3,313,845
Patented Apr. 11, 1967

3,313,845
BIS (4-SUBSTITUTED PHENYL) OXALATES
Aubert Yaucher Coran, Charleston, W. Va., and Constantine Emmanuel Anagnostopoulos, St. Louis, Mo., assignors to Monsanto Company, St. Louis, Mo., a corporation of Delaware
No Drawing. Filed June 19, 1963, Ser. No. 288,889
7 Claims. (Cl. 260—479)

The present invention relates to a new and useful class of organic compounds. More particularly, this invention is concerned with certain substituted phenyl esters of oxalic acid.

The compounds of this invention are characterized by the following formula:

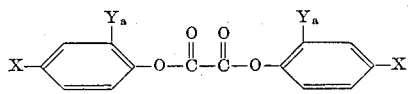

wherein:

$a$ is an integer from 0 to 1;
X is selected from the group consisting of alkyl of 4 to 18 carbon atoms and α-cumyl; and
Y is alkyl of 1 to 4 carbon atoms.

The compounds of this invention can be prepared by reacting a halide of oxalic acid with an appropriate substituted phenol, such as para-alkylphenol or an ortho, para-alkylphenol.

Specific examples of substituted phenols which are employed in the preparation of the compounds of this invention are 4-t-butylphenol, 4-t-amylphenol, 4-(1,1,3,3-tetramethylbutyl)phenol, 4 - (1 - ethyl - 1-methylpentyl)-phenol, 4-α-cumylphenol, 4-t-butyl-2-methylphenol, 2,4-di-t-butylphenol, 2-ethyl-4-(2-ethylhexyl)phenol, and the like. Other substituted phenols which are used are those produced by the reaction of phenol with a tertiary alkyl halide or with a mixture of such alkyl halides. Phenol is also reacted with branched chain olefins or mixtures thereof to produce the substituted phenols. The olefins which are employed are those wherein there is at least one branch on one of the carbon atoms of a double bond, as in the case of isobutylene or diisobutylene. The position of the unsaturation is generally immaterial, and one can employ α-olefins as well as olefins in which the double bond is remotely disposed with respect to the terminal carbon atoms.

The polymers of propylene having a total number of carbon atoms of from 6 to 18, and the polymers of butylene having a total number of carbon atoms of from 8 to 16, are generally well suited for the preparation of the alkylphenols which are useful in the preparation of the compounds of this invention. For example, one can employ propylene dimer, propylene trimer, propylene tetramer, propylene pentamer, propylene hexamer, isobutylene dimer, butylene trimer and butylene tetramer. The alkylphenols which are derived from propylene polymers having from 6 to 18 carbon atoms are a preferred class of alkylphenols to be used in the preparation of the compounds of this invention. The propylene polymers which are used in the preparation of these alkylphenols are available commercially and, in general, boil within the range of about 115° C. to about 300° C. Such alkylphenols, as well as the other alkylphenols contemplated herein, can be prepared by methods well known to those skilled in the art. One method of preparing the alkylphenols from propylene polymers is described in U.S. 2,865,966. The class of alkylphenols is preferably prepared according to the methods disclosed in U.S. application Ser. No. 21,872, filed Apr. 13, 1960, now abandoned; U.S. application Ser. No. 44,439, filed July 21, 1960, now U.S. Patent No. 3,257,437; and U.S. application Ser. No. 44,464, filed July 21, 1960, now abandoned.

Such terms as "propylene trimer" and "propylene tetramer," as used herein, shall be understood to refer to those hydrocarbons present in the product resulting from polymerization of propylene. Since such a polymerization reaction does not proceed so smoothly or accurately as to yield only exact tri or tetra multiples of the propylene feed, it should be clear that these terms are meant to be descriptive of the hydrocarbons present in the polymer product and boiling respectively within the $C_9$ and $C_{12}$ olefin boiling ranges, which ranges embrace the boiling points of the various isomeric $C_9$ and $C_{12}$ olefins present therein. Such a construction should also be given to the terms used to describe the other propylene polymers and the butylene polymers. It will be understood that the alkylphenols prepared from these polymers will be predominantly those wherein the alkyl group is connected to the nucleus by a tertiary carbon atom.

The oxalic acid halide which is employed in preparing the esters of this invention is preferably oxalyl chloride, although the other halides, e.g., bromide, can be used. The reaction of the halide with the phenol proceeds quite readily at room temperature in most instances, and at least a 2:1 molar ratio of phenol to halide is employed.

The preparation of several exemplary oxalic acid esters of this invention is hereinafter set forth in detail. It is to be understood that such specific examples are illustrative only and should not be construed as limiting the invention in any manner.

Example 1

This example describes the preparation of di(4-nonylphenyl)oxalate from a $C_9$-alkylphenol, distillation range (5 mm. Hg):

|  | ° C. |
|---|---|
| First drop | 288 |
| 5–95% | 288–313 |
| End | 316 | whose alkyl substituent is derived from propylene trimer (boiling range 121–138° C.).

A mixture containing 6.35 grams (0.05 mol) of oxalyl chloride, 22.04 grams (0.1 mol) of said $C_9$-alkylphenol, and 50 ml. of benzene is placed in a suitable flask. The mixture is agitated, and 6 ml. of triethylamine is added slowly. The resulting mixture is left at room temperature for about 30 minutes. The reaction mixture is then washed once with a dilute aqueous solution of HCl and with distilled water until a test shows that said mixture is neutral. The water and benzene are distilled off, and the product is filtered. There is obtained di(4-nonylphenyl)oxalate, $n_D^{25} = 1.5135$.

Example 2

Following the procedure of Example 1, the phenol reactant employed is derived from propylene pentamer (boiling range, 260–265° C.). There is obtained di(4-pentadecylphenyl)oxalate.

The procedure described in Example 1 is repeated with the phenols and oxalyl halide hereinafter set forth. The molar proportions are as previously employed, and the oxalic acid esters are obtained in yields of about 90% or greater.

Example 3

Phenol: $C_{13}$-alkylphenol derived from a propylene polymer mixture (boiling range, 200–260° C.) containing an average of 13 carbon atoms.
Halide: oxalyl chloride.
Ester: di(4-tridecylphenyl)oxalate.

Example 4

Phenol: C$_{18}$-alkylphenol derived from propylene hexamer (boiling range, 260–290° C.).
Halide: oxalyl chloride.
Ester: di(4-octadecylphenyl)oxalate.

Example 5

A mixture of 6.35 grams (0.05 mol) of oxalyl chloride, 20.6 grams (0.1 mol) of 4-(1,1,3,3-tetramethylbutyl)-phenol, and 50 ml. of benzene is charged to a suitable flask. This mixture is agitated, and 6 ml. of triethylamine is added slowly. The resulting mixture is left at room temperature for about 30 minutes. The reaction mixture is then washed once with a dilute aqueous solution of HCl and with distilled water until a test shows that the mixture is neutral. The water and benzene are distilled off, and the product is recrystallized from benzene. There is obtained bis[4-(1,1,3,3-tetramethylbutyl)phenyl] oxalate, M.P. 139–141° C.

The procedure described in Example 5 is repeated with the phenols and oxalyl halide hereinafter set forth. The molar proportions are as previously employed, and the oxalic acid esters are obtained in yields of about 75%.

Example 6

Phenol: 4-(1-ethyl-1-methylpentyl)phenol.
Halide: oxalyl chloride.
Ester: bis[4-(1-ethyl-1-methylpentyl)phenyl]oxalate.

Example 7

Phenol: 4-(1,1-dimethylbutyl)phenol.
Halide: oxalyl chloride.
Ester: bis[4-(1,1-dimethylbutyl)phenyl]oxalate.

Example 8

Phenol: 2,4-di-t-butylphenol.
Halide: oxalyl chloride.
Ester: di(2,4-di-t-butylphenyl)oxalate.

Example 9

A mixture containing 6.35 grams (0.05 mol) of oxalyl chloride, 15.02 grams (0.1 mol) of 4-t-butylphenol, and 50 ml. of benzene is placed in a suitable flask. The mixture is agitated, and 6 ml. of triethylamine is added slowly. The resulting mixture is left at room temperature for about 30 minutes. The reaction mixture is then washed with a dilute aqueous solution of HCl and with distilled water until a test shows that said mixture is neutral. The water and benzene are distilled off, and the product is recrystallized from an acetone-methanol solution. There is obtained di(4-t-butylphenyl)oxalate, M.P. 144–148° C.

Example 10

Following the procedure of Example 9, 4-n-butylphenol is employed as the phenol reactant. The product is recrystallized from petroleum ether, and there is obtained di(4-n-butylphenyl)oxalate, M.P. 52–55° C.

Example 11

Following the procedure of Example 9, the phenol reactant employed is 4-t-butyl-2-methylphenol. The product is recrystallized from an acetone-methanol solution, and there is obtained di(4-t-butyl-2-methylphenyl)oxalate, M.P. 140–142° C.

Example 12

Following the procedure of Example 9, the phenol reactant employed is 4-α-cumylphenol. The product is recrystallized from an acetone-methanol solution, and there is obtained di(4 - α - cumylphenyl)oxalate, M.P. 123–125° C.

The procedures detailed above are followed employing the phenols and halide hereinafter set forth. The molar ratios of the reactants will be as previously indicated, and the ester products are obtained in good yield.

Example 13

Phenol: 2-ethyl-4-n-hexylphenol.
Halide: oxalyl chloride.
Ester: di(2-ethyl-4-n-hexylphenyl)oxalate.

Example 14

Phenol: 4-n-decylphenol.
Halide: oxalyl chloride.
Ester: di(4-n-decylphenyl)oxalate.

Example 15

Phenol: 4-t-amylphenol.
Halide: oxalyl chloride.
Ester: di(4-t-amylphenyl)oxalate.

Example 16

Phenol: C$_{16}$-alkylphenol derived from butylene tetramer.
Halide: oxalyl chloride.
Ester: di(4-hexadecylphenyl)oxalate.

It should be pointed out that the alkylphenols employed in preparing the compounds of this invention need not necessarily be pure para or meta compounds. It will be apparent that, during the alkylation of the phenols, some isomeric material will be formed. Although it is preferred to employ alkylphenols which comprise only the single desired isomer, the presence of relatively minor amounts of other isomers does not have any significant adverse effect. For example, the alkylphenols which are derived from propylene and butylene polymers (e.g. Example 1) can be employed with a para to ortho ratio of 4:1. When isomeric mixtures are used, it is preferred that the para to ortho ratio be at least about 6:1.

The oxalic acid esters of this invention have been found to be effective stabilizers for polymeric materials. Said esters are especially effective as ultraviolet light stabilizers for polyolefins such as polyethylene, polypropylene and the like. From the standpoint of optimum effectiveness, readily available starting materials, and commercial practicality, a particularly preferred group of esters is characterized by the formula,

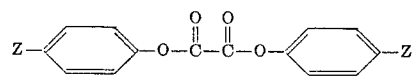

wherein Z is selected from the group consisting of α-cumyl and

where R, R$_1$ and R$_2$ are each alkyl of 1 to 15 carbon atoms, and the sum of R+R$_1$+R$_2$ is up to 17 carbon atoms.

As illustrative of the stabilizing action of the oxalic acid esters of this invention, polyethylene (average molecular weight of about 20,000) films (5 mils thick) containing 1% by weight of said esters exhibit remarkable stability to the degradative effects of ultraviolet light. For example, 5-mil films containing 1.0% concentration of the following esters:

(A) Di(4-t-butylphenyl)oxalate,
(B) Bis[4-(1,1,3,3-tetramethylbutyl)phenyl]oxalate, and
(C) Di(4-nonylphenyl)oxalate (see Example 1), were exposed to ultraviolet light in a specially designed apparatus. Said apparatus comprises a chamber having an exhaust fan mounted therein and having a number of spaced, air intake openings. A horizontal turntable is mounted in said chamber, and an artificial source of ultraviolet light is suspended above the center of the turntable. A plurality of vertical brackets is spaced around the perimeter of the turntable, and the films to be tested are attached to said brackets substantially in the plane of the ultraviolet source.

The test films, and control films, are exposed to the ultraviolet source at a distance of five inches. At the end of the exposure period, the films are analyzed for carbonyl content, which is a measure of degradation. Carbonyl content is determined by measurement of the infrared absorption in the 5.82 millimicron region and is expressed as mols$\times 10^4$ per liter. The results obtained are tabulated below.

| Additive | Hours Exposed | Carbonyl Content |
|---|---|---|
| None | 90 | 98 |
| Ester (A) | 90 | 36 |
| Ester (B) | 90 | 18 |
| Ester (C) | 90 | 46 |
| None | 210 | 287 |
| Ester (A) | 210 | 195 |
| Ester (B) | 210 | 160 |
| Ester (C) | 210 | 265 |

Similar results are obtained when the other oxalic acid esters of this invention are tested in the above manner.

The amount of the ester of this invention employed in any polymer composition can be varied widely, depending upon the particular polyolefin, the thickness of the polymer article, and the use for which the article is intended. Concentrations of the esters of from about 0.001% to 10% by weight of the polyolefin can be used, with concentrations of 0.1% to 3% being preferred.

The oxalic acid esters can be used in polymer compositions containing the common additives such as pigments, fillers and heat stabilizers. They can also be used in combination with known light stabilizers. A more comprehensive description of the use of the instant oxalates as ultraviolet light stabilizers is found in copending application, Ser. No. 288,926, filed June 19, 1963, and now Patent No. 3,271,358.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A compound of the formula,

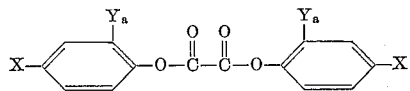

wherein:

$a$ is an integer from 0 to 1;
X is selected from the group consisting of alkyl of 4 to 18 carbon atoms and α-cumyl; and
Y is alkyl of 1 to 4 carbon atoms.

2. A compound of the formula,

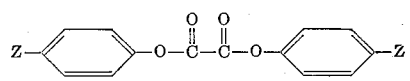

wherein Z is selected from the group consising of α-cumyl and

where R, $R_1$ and $R_2$ are alkyl of 1 to 15 carbon atoms, and the sum of $R+R_1+R_2$ is up to 17 carbon atoms.

3. Di(4-nonylphenyl)oxalate.
4. Bis[4-(1,1,3,3-tetramethylbutyl)phenyl]oxalate.
5. Di(4-t-butylphenyl)oxalate.
6. Di(4-t-butyl-2-methylphenyl)oxalate.
7. Di(4-α-cumylphenyl)oxalate.

References Cited by the Examiner
UNITED STATES PATENTS 2,632,769  3/1953  Bell et al. _____ 260—479
3,106,570  10/1963  Jaruzelski et al. _____ 260—479

OTHER REFERENCES

Mikshich et al.: Chemical Abstracts, vol. 25, page 4246 (1931).

Thomas et al.: Journal of the American Chemical Society, vol. 80, pp. 5864–5867 (1958).

LORRAINE A. WEINBERGER, *Primary Examiner.*

I. R. PELLMAN, *Assistant Examiner.*